United States Patent Office 2,889,321
Patented June 2, 1959

2,889,321

11-OXYGENATED SPIRO[3-OXOANDROST-(4-ENE AND 1,4 - DIENE) - 17,4' - (2',5' - DIOXO - M - DIOXANES)]

Clarence G. Bergstrom, Chicago, Ill., assignor to G. D. Searle & Co., Chicago, Ill., a corporation of Delaware No Drawing. Application December 23, 1957
Serial No. 704,842

5 Claims. (Cl. 260—239.55)

This invention relates to 11-oxygenated spiro[3-oxo-androst-(4-ene and 1,4-diene)-17,4'-(2',5'-dioxo-m-dioxanes)] and processes for the manufacture thereof. More particularly, this invention relates to compounds of the formula

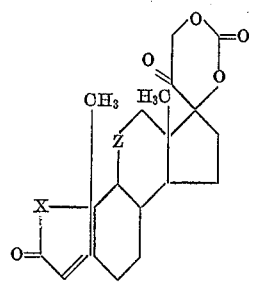

wherein X represents an ethylene or vinylene radical and Z represents a hydroxymethylene or carbonyl radical.

The nomenclature herein is that recommended for compounds of class DII in Patterson and Capell's The Ring Index. See also sections 108 and 125 of the introduction to the 1945 Subject Index of Chemical Abstracts.

The compounds to which this invention relates are useful because of their valuable and diverse pharmacological activity. For example, they are anti-inflammatory agents characterized by properties such as the capacity to prevent iritic hyperemia and inhibit the formation of granulomatous tissue. Moreover, the subject compositions manifest glucocorticoid effects, being adapted to the encouragement of glycogen deposition in the liver. Further, they are diuretics.

The claimed compositions are manufactured from appropriately 11-oxygenated 17-alkoxycarbonyloxyacetyl-17-hydroxyandrost-4-en-3-ones of the formula

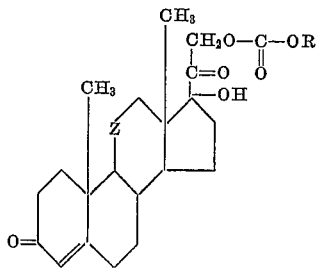

wherein Z has the meaning assigned before, and R designates preferably a lower alkyl radical, by contacting the aforesaid starting material, at elevated temperatures and in an inert solvent, with a selectively strong acid, such as p-toluenesulfonic acid, under conditions whereby the alcohol liberated, ROH, is removed from the reaction mixture by vaporization and separate condensation in the presence of a metallic oxide capable of reacting therewith. The spiro[androst-4-enes] thus obtained are converted to corresponding 1,4-dienes via selenous acid in tert.-butyl alcohol containing a trace of acetic acid.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*Example 1*

*Spiro[3,11 - dioxoandrost - 4 - ene - 17,4' - (2',5'-dioxo-m-dioxane)]*.—Approximately 1000 parts of benzene is distilled from a solution of 35 parts of 17β-ethoxycarbonyloxyacetyl - 17α - hydroxyandrost - 4 - ene - 3,11-dione in 5000 parts of benzene, whereupon provision is made to condense further distillate and return it to the reaction vessel via a porous container in which is placed 1000 parts of barium oxide. Approximately 5 parts of p-toluenesulfonic acid is added to the benzene solution, which is maintained at the boiling point for 48 hours. At the end of 24 hours, an additional 1 part of p-toluenesulfonic acid is introduced. The solution becomes dark brown with a greenish fluorescence. Following the heating period, the solution is washed with 1000 parts of aqueous 4 percent sodium bicarbonate and then 3 times with water. After drying over anhydrous sodium sulfate, the solution is stirpped of solvent by evaporation; and the residue is taken to chromatography for purification, using silica gel as the adsorbent, and benzene and ethyl acetate as developing solvents. From the eluate comprising 15 percent ethyl acetate there is obtained, on evaporation of solvent, a residue which, recrystallized from ethyl acetate, melts at 236.5–239° C. This material is spiro[3,11-dioxoandrost - 4 - ene - 17,4' - (2',5' - dioxo - m - dioxane)], of the formula

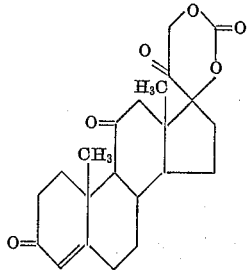

*Example 2*

*Spiro[3,11 - dioxoandrosta - 1,4 - diene - 17,4' - (2',5'-dioxo-m-dioxane)]*.—To a solution of 8 parts of spiro[3,11 - dioxoandrost - 4 - ene - 17,4' - (2',5' - dioxo - m-dioxane)] in 960 parts of tert.-butyl alcohol, protected by a nitrogen atmosphere and heated at the boiling point under reflux, is added 18 parts of acetic acid and 3 parts of selenous acid. Boiling is maintained for approximately 24 hours, there being an additional 1 part of selenous acid introduced after the first 6 hours. The selenous acid turns dark and appears to partly dissolve, later giving rise to metallic selenium at the end of the heating period. The yellow-brown solution is filtered through diatomaceous earth, and the orange filtrate is evaporated in vacuo to a wet, crystalline, brown solid which is taken up in 5400 parts of hot ethyl acetate. This solution is cooled to room temperatures, washed twice with aqueous 5 percent sodium bicarbonate and then 3 times with water, after which it is dried over anhydrous sodium sulfate and stripped of solvent by vacuum distillation. The predominantly yellow residue is purified by chromatography on silica gel, using benzene and ethyl acetate as developing solvents. From eluates comprising 15 and 20 percent of ethyl acetate there is obtained, on evaporation of solvent, pure spiro[3,11-dioxoandrosta-1,4-diene-17,4'-(2',5'-dioxo-m-dioxane)]. The product melts at 269–274° C. and has the formula

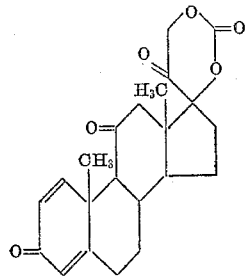

Example 3

*Spiro[11β - hydroxy - 3 - oxoandrost - 4 - ene - 17,4'-(2',5'-dioxo-m-dioxane)].*—Proceeding substantially as in Example 1, approximately 270 parts of benzene is distilled from a solution of 7 parts of 17β-ethoxycarbonyloxyacetyl-11β,17α-dihydroxyandrost-4-en-3-one in 1350 parts of benzene, whereupon provision is made to condense further distillate and return it to the reaction vessel via a porous container in which is placed 216 parts of barium oxide. Slightly more than 1 part of p-toluenesulfonic acid is added to the benzene solution, which thereafter is maintained at the boiling point for approximately 24 hours. The solution is then preliminarily washed with 100 parts of water, following which it is washed with 200 parts of aqueous 3 percent sodium bicarbonate, and then finally 3 times with copious quantities of water. The solution is next dried over anhydrous sodium sulfate, and at last stripped of solvent by vacuum distillation. The residue is purified by chromatography on silica gel, using benzene and ethyl acetate as developing solvents. There is obtained by this means pure spiro[11β-hydroxy-3-oxoandrost-4-ene-17,4'-(2',5'-dioxo-m-dioxane)], the melting point of which is 240.5–243° C. This material has the formula

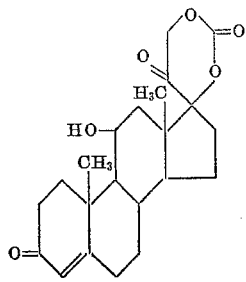

Example 4

*Spiro[11β - hydroxy - 3 - oxoandrosta - 1,4 - diene-17,4'-(2',5'-dioxo-m-dioxane)].*—Using the technique of Example 2, but substituting spiro[11β-hydroxy-3-oxoandrost - 4 -ene - 17,4' - (2',5' - dioxo - m - dioxane)] for the spiro[3,11-dioxoandrost-4-ene-17,4'-(2',5'-dioxo-m-dioxane)] therein, one obtains spiro[11β-hydroxy-3-oxoandrosta - 1,4 - diene - 17,4' - (2',5' - dioxo - m - dioxane)], of the formula

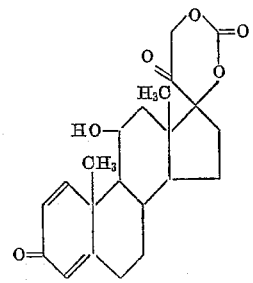

What is claimed is:
1. A compound of the formula

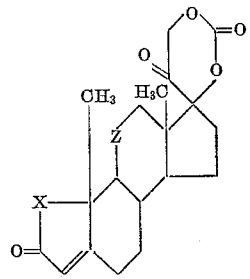

wherein X is selected from the group consisting of ethylene and vinylene radicals, and Z is selected from the group consisting of hydroxymethylene and carbonyl radicals.

2. Spiro[3,11 - dioxoandrost - 4 - ene - 17,4' - (2',5'-dioxo-m-dioxane)] melting at 236.5–239° C.

3. Spiro[3,11 - dioxoandrosta - 1,4 - diene - 17,4'-2',5'-dioxo-m-dioxane)] melting at 269–274° C.

4. Spiro[11β - hydroxy - 3 - oxoandrost - 4 - ene - 17,4'-(2',5'-dioxo-m-dioxane)] melting at 240.5–243° C.

5. Spiro[11β - hydroxy - 3 - oxoandrosta - 1,4 - diene-17,4'-(2',5'-dioxo-m-dioxane)].

No references cited.